United States Patent Office 3,459,227
Patented Aug. 5, 1969

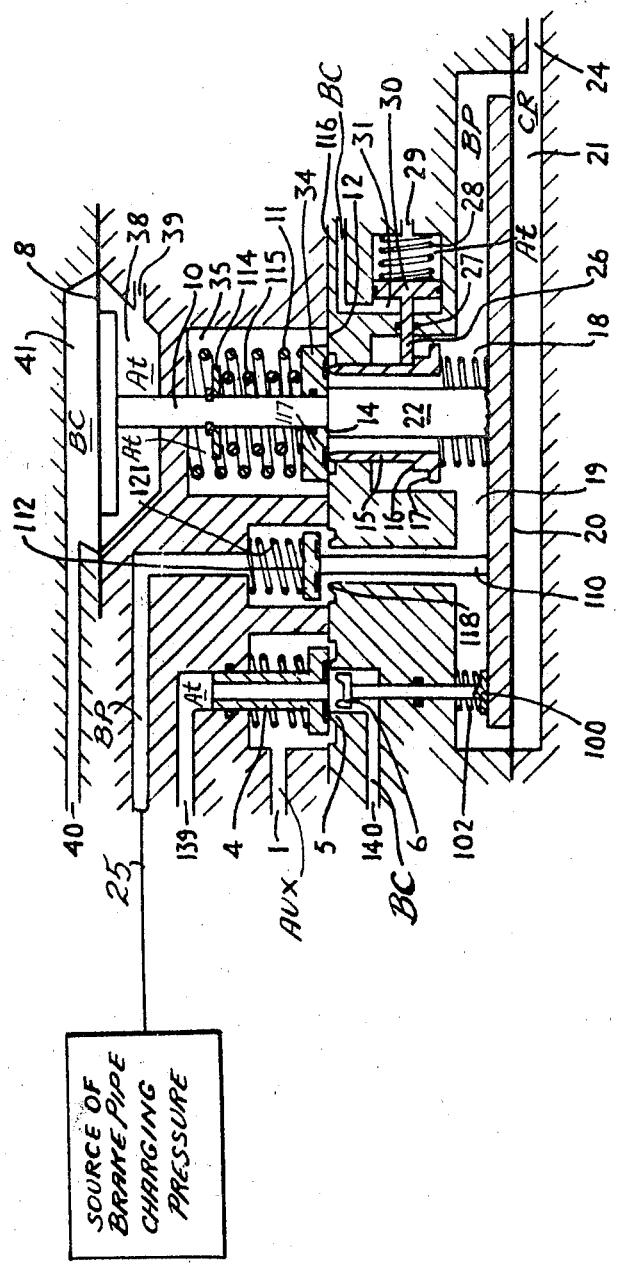

3,459,227
DISTRIBUTORS FOR BRAKING APPARATUS
Arthur W. Simmons and Jack Washbourn, London, England, assignors to Westinghouse Brake and Signal Company, Limited, London, England
Filed Nov. 2, 1965, Ser. No. 506,075
Int. Cl. F16k *11/10;* B60t *15/42;* B61h *13/00*
U.S. Cl. 137—627.5     6 Claims

ABSTRACT OF THE DISCLOSURE

A distributor for a fluid operable braking apparatus having a quick service valve, a brake cylinder inlet/exhaust valve and a retarded brake pipe recharging valve. All valves are operated by a diaphragm of the distributor pile. The stop face of the quick service valve, a seat of the brake cylinder inlet/exhaust valve—and possibly a seat of the recharging valve—are substantially coplanar.

---

This invention relates to distributors for fluid pressure braking apparatus. Such distributors are used, for example, on trains wherein each distributor would be located on a car of the train to operate brakes on that car. The distributor includes normally pressurized control areas referred to as "control reservoir" and "brake pipe." Variations of the pressure in these areas control the flow of pressurized fluid to and from the brake cylinder to operate the brakes. The pressure fluid for the cotnrol areas of all the distributors on the train and also the pressurized fluid for the brake cylinder would normally be supplied from a main central source, for example from the engine of the train, this fluid being supplied through suitable tubing or piping or the like along the length of the train. In such distributors, in addition to the inlet/exhaust valve having an element movable into and out of engagement with a valve seat for controlling the supply of air to the brake cylinder associated with the distributor, it is known to provide a device, generally referred to as a "quick service valve" for effecting a rapid reduction of the pressure in the "brake pipe" control area; this pressure differential in turn causing a more rapid operation of the said inlet/exhaust valve, and hence a more rapid application of the brake. The purpose of this device is to obtain rapid operation of the numerous distributors throughout the length of the train. This device may take the form of a valve between the "brake pipe" control area and atmosphere, wherein initial reduction of brake pipe pressure (caused for example by the brakeman to stop the train) causes the quick service valve to open, thereby accelerating the reduction of pressure in the brake pipe area and hence accelerating application of the brake. In such distributors there is provided what is called a "pile," that is a diaphragm arrangement to which various pressures are applied and by the movement of which under the influence of variation in the applied pressures, the movement of the movable elements of the respective valves is controlled. Such distributors will hereinafter be referred to as "of the type described" and may or may not include a further valve known as a retarded recharge valve also having an element movable into and out of engagement of a seat, which in operation retards the recharging of the brake pipe.

The present invention provides a distributor of the type described in which the position of the pile in its normal "release" position is determined by the movable element of the quick service valve engaging a stop face which is on the same plane as the seat of the inlet/exhaust valve and on the same plane as the seat of the retarded recharge valve when provided.

Preferably the movable element of each valve has associated with it a stem by which, in operation of the distributor, movement of the respective movable element is secured; each stem being commonly actuable by means of a diaphragm follower carried by a diaphragm of the pile.

The stem associated with the movable element of the quick service valve may, when the pile is comprised by a plurality of diaphragms, constitute the means by which the diaphragms are interconnected In this case, said means may be provided along its length with a shoulder into engagement with which the movable element of the quick service valve in the normal "release" position of the pile, is resiliently urged Moreover, the movable element of the quick service valve may be resiliently urged into engagement with said stop face when the pile is in the normal "release" position.

The stem of the inlet/exhaust valve may have a valve seat engageable with the movable element of that valve to control the exhaust of air from the brake cylinder.

One embodiment of the present invention will now be described in greater detail, by way of example only, with reference to the accompanying drawing which shows a diagrammatic representation of a distributor To clearly point out the subject matter of the present invention only the pertinent portion of the distribuor is shown in the drawing. In particular, the numerous fluid lines connecting the illustrated portions to the brake cylinder, to atmosphere or to a source of pressurized fluid, as the case may be, have been omitted for clarity. However to facilitate reading the drawing the various chambers have been labeled. "BC" indicates brake cylinder pressure; "BP" indicates brake pipe pressure; "CR" indicates control reservoir pressure; "At" indicates atmospheric pressure; and "Aux" indicates auxiliary reservoir pressure.

In the drawing a main diaphragm pile comprises a diaphragm 8 having a chamber 41 above it, connecting at 40 with a brake cylinder, and a chamber 38 below it connecting at 39 with atmosphere. The diaphragm 8 is connected by stem 10/20 with diaphragm 20. This diaphragm has chamber 19 above it connecting at 25 with the brake pipe, and chamber 21 below it connecting at 24 with the control reservoir.

Above an exhaust valve seat 6 is a valve 4 co-acting with seat 5.

Stem 10 passes from chamber 38 into chamber 35 which is at atmospheric pressure. In this chamber 35 is valve 34 which is urged downwards by spring 11 and rests on shoulder 14 formed between the two stem portions 10 and 22. The valve element connecting the chambers 19 and 35 constitute the quick service valve. The valve 34 also rests on stop face 12 on the main body of the quick service valve.

In chamber 19 is placed a valve sleeve 15 which is urged upwards into contact at its seat with valve 34 by means of spring 18 and is sealingly reciprocable with part 117.

Sleeve 15 is provided with stepped shoulders 16 and 17.

The valve and pile are shown in normal release position, in which position stem 26 is engageable on the shoulder 16. Stem 26 is connected with piston 30 and passes by means of gland 27 between chambers 19 and 31, the latter connecting with the brake cylinder. Piston 30 is subject on its left hand side, as shown on the drawing, to brake cylinder pressure, and on its righthand side as shown on the drawing, with atmosphere chamber 29 and spring 28.

Diaphragm 20 has brake pipe pressure acting on the chamber 19 side of it and control reservoir pressure acting on the other side of it (chamber 21) whilst diaphragm 8 has brake cylinder pressure in chamber 41 acting against atmosphere in chamber 38.

The inlet and exhaust valve 5, 6 is positioned so that the inlet valve seat 5 is on the same plane 116 as a stop face 12 for the quick service valve whilst a retarded recharge valve 112 having a spring 121 is positioned on the same plane similarly.

The inlet valve 4 is controlled by a stem 100 operated from the main diaphragm 20. The stem 100 is spring loaded against the diaphragm by a spring 102 which is of sufficient load to overcome brake pipe pressure acting upwards on the stem. At the top of the stem 100 there is formed the exhaust valve seat 6 which, when contacting valve member 4, closes off the connection between brake cylinder at 140 and atmospheres at 139, the atmosphere connectio 139 being taken through the valve 4.

Further upward movement of the seat 6 (as viewed in the drawing) raises the valve member 4 of seat 5, thereby placing the pressurized auxiliary reservoir 1 in fluid communication with brake cylinder 140 for applying the brake.

The retarded recharge valve 112 is interposed in the brake pipe connection 25 and the brake pipe chamber 19 above the diaphragm 20. In brake release position the valve 112 is open, the main diaphragm pile being held in the position illustrated by retarded recharge spring 115 acting between washer 114, which is stopped by a circlip on the stem 10 and the shoulder 14 formed on stem 22. The quick service valve, and hence the pile, is, therefore, held in the position where the quick service valve is against stop face 12, the upward effort of brake pipe pressure on the quick service valve being over-balanced by the downward effort of spring 11 above the quick service valve.

The purpose of retarded recharge valve 112 is to restrict the build up in pressure in the brake pipe chamber 19 during a release and so ensure that the pressure build up in the brake pipe 25 is transmitted to the rear of the train.

If a brake release is made with the brake pipe pressure increasing at a greater rate than the brake cylinder pressure decreases then a pressure dfference will be created across the pile which will move down to release position. Increase in pressure difference will cause the pile to move down further by compressing the retarded recharge spring 115. The quick service valve will be left against stop face 12 and shoulder 14 on stem 22 will be moved away from the quick service valve. Thus stem 110 will move down with the diaphragm 20 permitting retarded recharge valve 112 to move towards its seat 118, under the force of its loading spring 121, throttling the connection 25 between brake pipe and brake pipe chamber 19 and so maintaining a limited pressure increase in the chamber depending on the value of the spring 115. It is necessary for the pressure difference at which the retarded recharge valve closes to be as consistent as possible as, during initial charging, this pressure difference is used to charge the control reservoir.

It will be appreciated that with the pile in the brake release position and the shoulder 14 of the main stem 22 against the underside of the quick service valve 34, the important valve openings, such as exhaust valve and retarded recharge valve, can be closely controlled as they depend only on the dimensions of a few parts, all the seats being on the same face. Moreover, with such a construction, the inlet and exhaust valve and the retarded recharge valve are both actuated by the same upper surface of the main diaphragm follower which is closely associated dimensionally with shoulder 14 on stem 22. Thus the number of dimensions affecting the valve movements can be kept to a minimum, and consequently the quantity of machining tolerances can be kept to a minimum, resulting in the total stroke of the pile being kept to a minimum.

The invention is not limited to the specific embodiment described above and modifications may be made therein. For example, instead of the shoulders 16 and 17 being formed on the member 15 they may be made on the latch 26 in the form of steps and arranged to cooperate with one step on the valve seat member 15. Moreover, the quick service valve and latch arrangement described may be replaced by any other suitable valve arrangement for operation in conjunction with the inlet/outlet and retarded charge valves.

It will be realised by those skilled in the art that in a distributor the valves have to operate in a definite sequence, i.e., the exhaust valve must not close, whatever the limits on dimensions, before the quick service valve has opened a predetermined amount. Therefore, the number of dimensions affecting a particular valve opening has a considerable affect on the stroke.

It will also be realised that although the operation of the apparatus has been described with reference to the use of fluid at super-atmospheric pressure (e.g. compressed air), it may be adapted for use with fluid at sub-atmospheric pressure (e.g. vacuum).

Having thus described our invention what we claim is:

1. A distributor for fluid operable braking apparatus comprising a brake cylinder inlet and exhaust valve for controlling the flow of fluid to and from a brake cylinder, said inlet and exhaust valve having a movable element and a valve seat, a quick service valve which when opened, permits a rapid operation of the said inlet and exhaust valve, said quick service valve having a movable element and a stop face, a diaphragm member mounted in said distributor for controlling both the inlet and exhaust valve and the quick service valve, the position of the diaphragm in the normal brake release position being determined by said stop face wherein the said valve seat is substantially coplaner with said stop face.

2. A distributor as claimed in claim 1 wherein the movable element of each valve has associated with it a stem which, in operation of the distributor is operable to move the respective movable element, each stem being commonly actuable a diaphragm follower carried by said diaphragm.

3. A distributor as claimed in claim 2, wherein the stem of the inlet/exhaust valve has a valve seat engageable with the movable element of that valve for controlling the exhaust of air from the brake cylinder.

4. A distributor as claimed in claim 1 wherein the movable element of the quick service valve is resiliently urged into engagement with said stop face when the brake is in its normal release position.

5. A distributor according to claim 1 wherein in the normal brake release position a brake pipe chamber between the diaphragm and the quick service valve is at a predetermined pressure, whereby after a brake application the said brake pipe pressure is recharged to said predetermined pressure and including a charging valve for retarding the recharging of the brake pipe chamber, said charging valve having a movable element and a seat, said charging valve seat also being substantially coplanar with said stop face.

6. A distributor according to claim 5, wherein the brake cylinder inlet and exhaust valve, the quick service valve and the charging valve are each movable by a stem, said stems being commonly actuable by the said diaphragm.

References Cited

UNITED STATES PATENTS

| | | | |
|---|---|---|---|
| 3,252,471 | 5/1966 | Olson | 137—627.5 X |
| 3,302,982 | 2/1967 | Pekrul | 137—627.5 X |
| 3,310,350 | 3/1967 | Wilson | 137—627.5 X |

CLARENCE R. GORDON, Primary Examiner

U.S. Cl. X.R.

303—38, 47